United States Patent [19]

Weiffenbach et al.

[11] Patent Number: 4,938,585

[45] Date of Patent: Jul. 3, 1990

[54] METHOD AND APPARATUS FOR HIGH SPEED RECORDING OF IMAGES AND OF INFORMATION ASSOCIATED WITH THE IMAGES

[75] Inventors: Bernard Weiffenbach; Bernard Gizard, both of Paris, France

[73] Assignee: Societe Francaise d'Appareillage de Telecommandes, Paris, France

[21] Appl. No.: 334,772

[22] Filed: Apr. 10, 1989

Related U.S. Application Data

[63] Continuation of Ser. No. 149,366, Jan. 28, 1988, abandoned.

[30] Foreign Application Priority Data

Feb. 6, 1987 [FR] France .................... 87 01451

[51] Int. Cl.$^5$ ............................................. G03B 21/50
[52] U.S. Cl. ........................................ 352/92; 352/236; 352/129; 352/90; 352/170
[58] Field of Search .................... 352/92, 236, 17, 129, 352/90, 170, 172, 20

[56] References Cited

U.S. PATENT DOCUMENTS

| | | | |
|---|---|---|---|
| 4,150,882 | 4/1979 | Konick | 352/92 |
| 4,215,920 | 8/1980 | Butler | 352/92 |
| 4,385,814 | 5/1983 | Elliott | 352/92 |
| 4,466,714 | 8/1984 | Dyfverman | 352/129 |
| 4,659,198 | 4/1987 | Beauviala et al. | 352/92 |
| 4,673,266 | 6/1987 | Flumi | 352/92 |

Primary Examiner—Monroe H. Hayes
Attorney, Agent, or Firm—Oblon, Spivak, McClelland, Maier & Neustadt

[57] ABSTRACT

A method of high speed recording of images and of information associated with the images by means of a motion picture camera (10) for high speed shooting, the camera being equipped with an image pulse generator, and the method comprising the following steps during shooting: acquiring and storing the information associated with the images in a large capacity fast access memory (32) at the image rate under the control of the image pulses generated by said camera image pulse generator; and electro-optically writing at least one reference signal on the motion picture film beside the image corresponding to the first stored information.

8 Claims, 9 Drawing Sheets 1 (PRIOR ART)

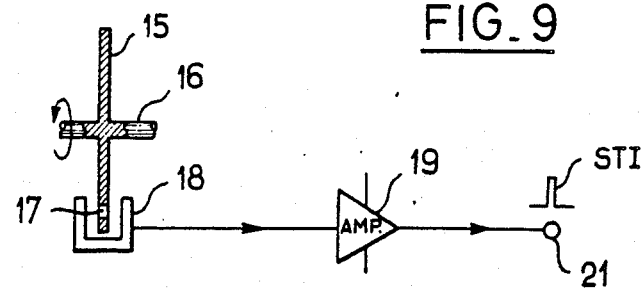
FIG_9
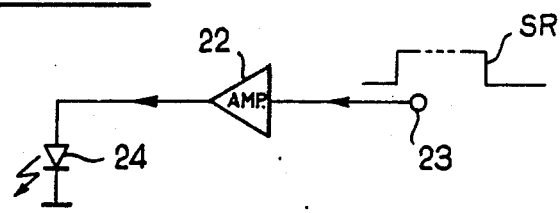
FIG_10a
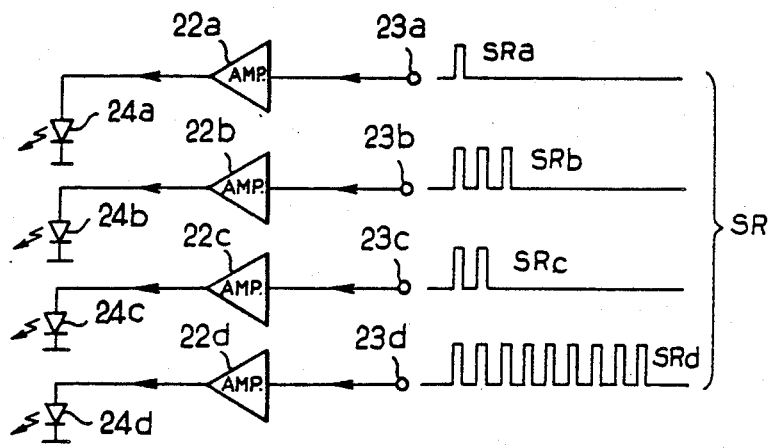
FIG_10b

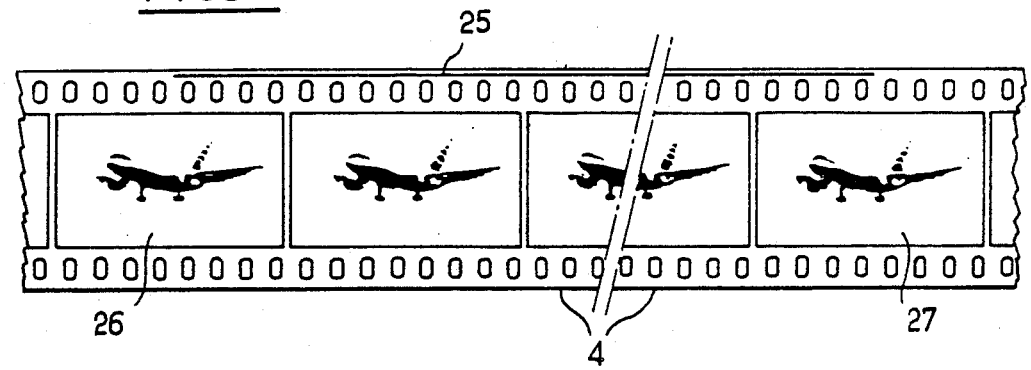
FIG_11
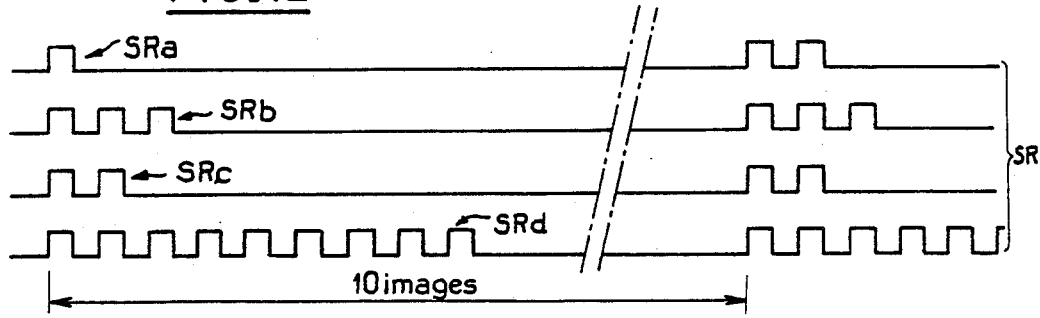
FIG_12
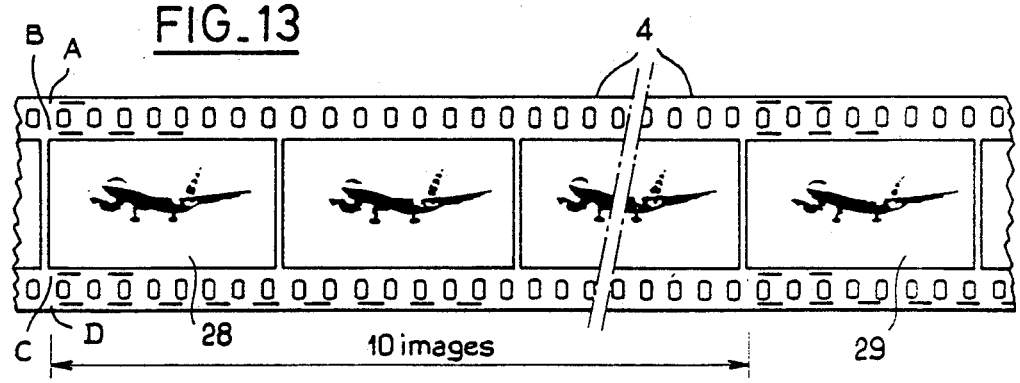
FIG_13

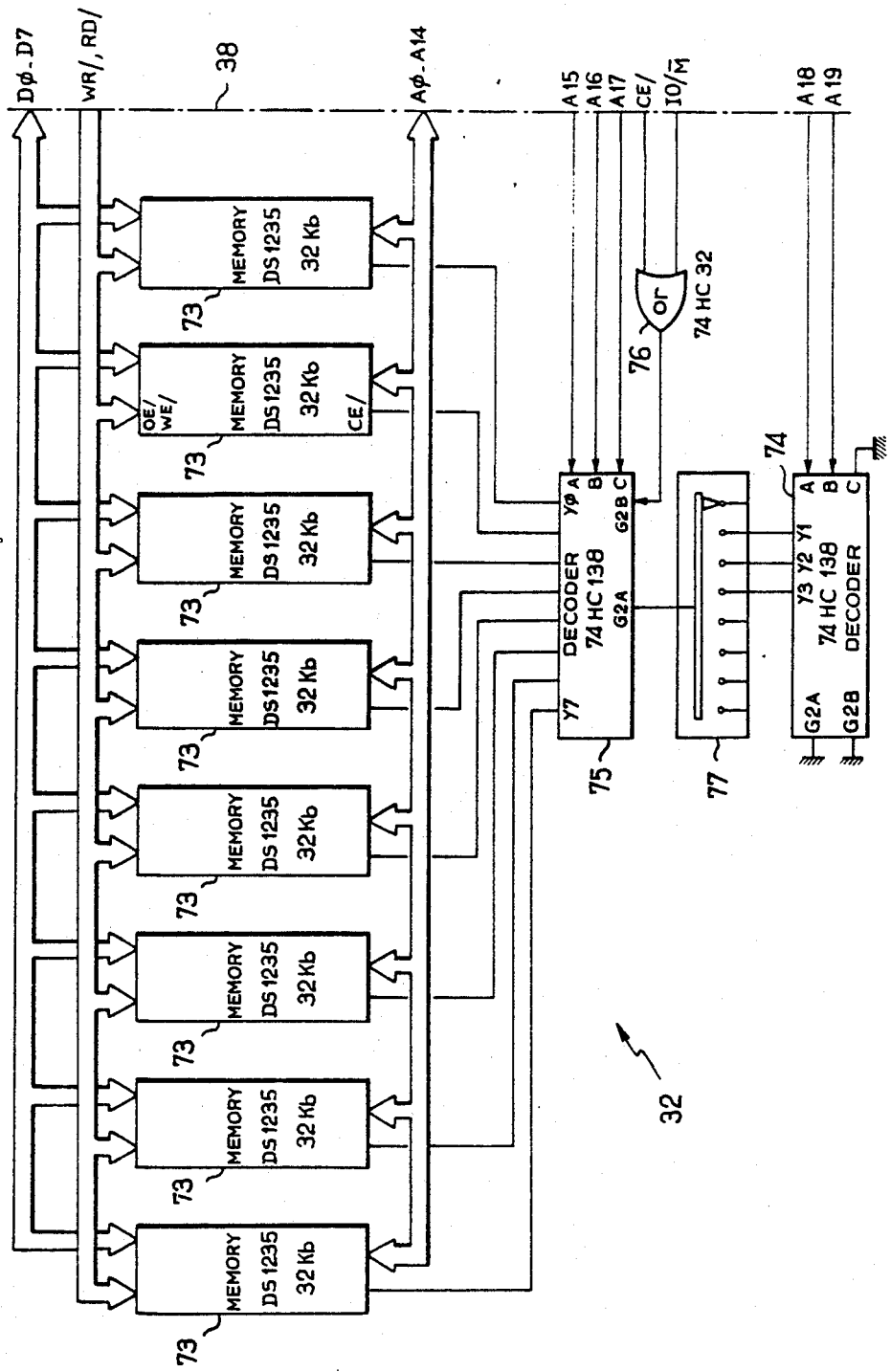
FIG_16

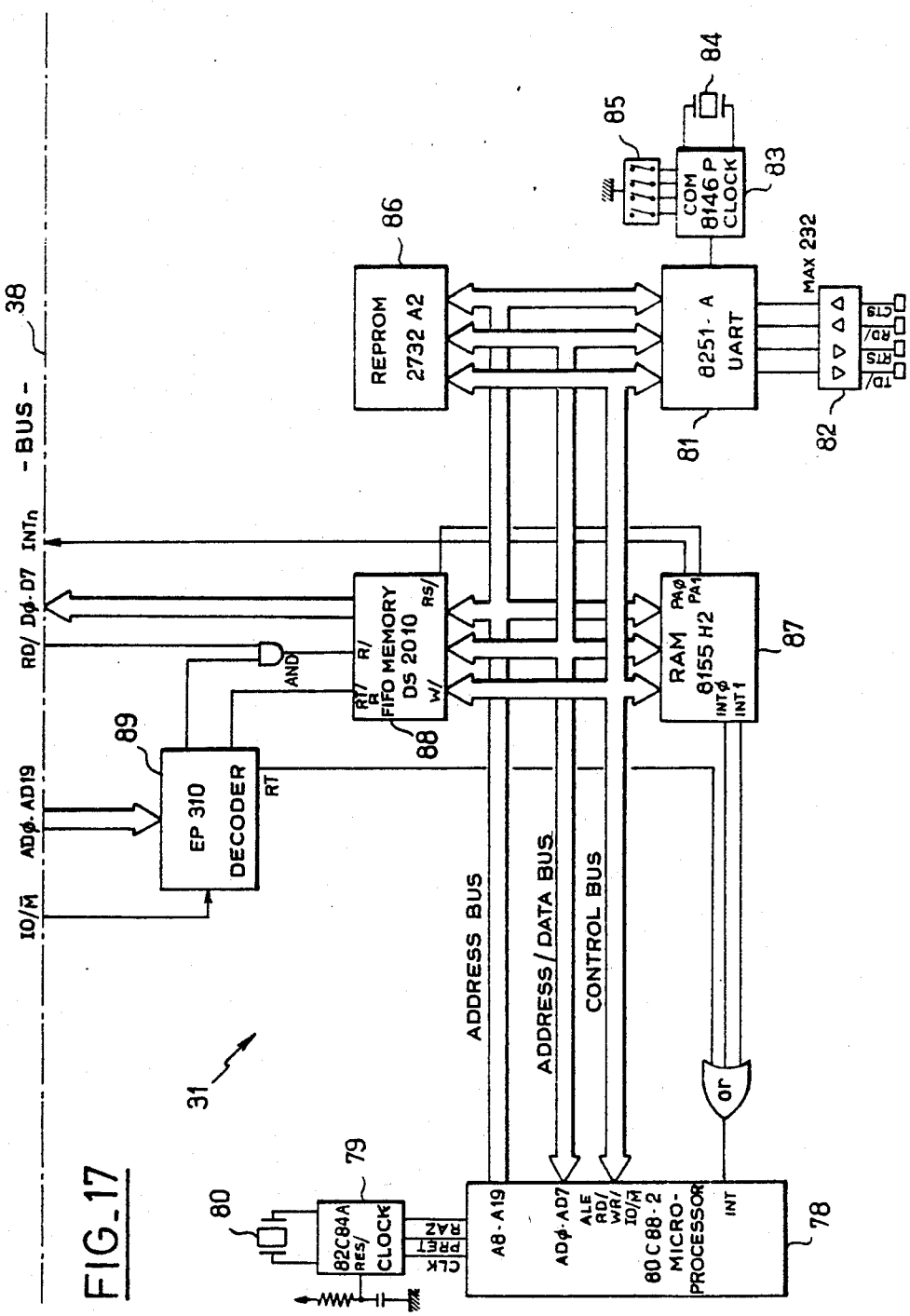
FIG_17

METHOD AND APPARATUS FOR HIGH SPEED RECORDING OF IMAGES AND OF INFORMATION ASSOCIATED WITH THE IMAGES

This is a continuation of Ser. No. 149,366, filed 1/28/88, now abandoned.

BACKGROUND OF THE INVENTION

1. Field of the Invention

The present invention relates to a method of high speed recording of images and of information associated with the images by means of a motion picture camera for high speed shooting equipped with an image pulse generator and also to an apparatus for implementing the method.

2. Discussion of Background

At present, motion picture cameras for high speed shooting using claws or rotary prisms are equipped with or are suitable for being equipped with light emitting diodes (LEDs) or alphanumeric character displays for writing information on the motion picture film. FIG. 1 of the accompanying drawings shows a prior art motion picture camera 1 for high speed shooting. A box 2, which is conventionally disposed adjacent to the camera 1, contains electronic circuits which receive information from one or more information sources 3a, 3b, ..., 3n, for example an IRIG B time source or clock, and speed, pressure, temperature, etc. sensors providing information or data in analog form or in serial or parallel digital form. If necessary, said information may be decoded in the box 2 and then recoded in a form that is suitable for being written on the motion picture film.

At present, there are two known methods of writing information on film. The first method consists in recording the information on marginal tracks of the motion picture film 4 by means of an electro-optical device 5 placed adjacent to a loop of motion picture film in the camera 1, as shown in FIG. 2. This method is similar to the method of recording image pulses from a camera and from a time base in an auxiliary recorder. The portion of the film which is used as the recording medium is a portion which is running at a steady speed. One to four LEDs are conventionally used for writing information to the marginal tracks of the motion picture film. A track 6 may be written on either side of each of the rows of perforations or sprocket holes 7 of the motion picture film 4, as shown in FIG. 3.

The second known method consists in writing information on the motion picture film 4 in binary form or in binary coded decimal (BCD) form, etc. as a matrix as shown in FIGS. 5 and 6 and at the bottom of FIG. 7, or else in the form of characters in the clear as shown at the top of FIG. 7, for example by means of an alphanumeric character display 8 and an optical system comprising reflector elements 9 and 11 as shown in FIG. 4 In this case, the information may be written on the motion picture film 4 either within each image frame or to one side thereof (FIG. 3), or in the gap between two successive image frames (FIG. 5) for discontinuous motion cameras, or else to one side of the images per se in a zone lying between the images and one of the rows of sprocket holes 7 of the film 4 (FIG. 6) or else between successive frame sprocket holes 7 when using a 16 mm motion picture film (FIG. 7).

Prior art methods of writing information on a motion picture film in a high speed camera suffer from various drawbacks.

In particular, the amount of information which can be written on marginal tracks in the form of serial bits is limited, at high speed, by the minimum bit length (0.2 mm) and by possible blurring effects which give rise to difficulty in reading back the information written on the film.

The writing of matrices or characters in the clear in the image frames, between successive frames, or between the images per se and the sprocket holes of the film all limit the area of film available for images per se. When using matrices or characters in the clear, each camera must be equipped with electro-optical write devices which, given the high speed at which the film is running, are expensive and difficult to install, and in particular are difficult to retrofit to existing equipment. In addition, the writing of matrices or characters in the clear between two successive film sprocket holes or in the gap between two image frames is not always compatible with said information being transferred when the film is duplicated using standard means.

In any event, the amount of information which can be written on film in association with each image frame is relatively limited.

When the information on the motion picture film is being examined by means of a film reader, it is easier to read characters which are in the clear than it is to read serial bits or encoded matrices However, in all cases the manual transfer of such information via a keyboard to enter said information into a memory of the film reader is a long and tedious process. With some prior film readers, it is possible to examine the information on the film automatically; however this requires equipment which is expensive and often complex for reading the serial bits, the encoded matrices, or the characters in the clear. Further, each type of writing requires special equipment and software specific to the location of the information on the film, to the kind of code used, to the sizes of the bits, etc.

The present invention therefore seeks to provide a method and apparatus enabling images and information associated with the images to be recorded at high speed without it being necessary to equip the motion picture camera used for shooting with expensive and complex electro-optical elements for recording said information, and without it being necessary to equip the film reader with expensive and complex electro-optical elements for reading back the information associated with the images.

The present invention also seeks to provide a method and apparatus making it possible, if so desired, to record a greater number of additional data items with each motion picture film image, even when using cameras operating at very high rates.

SUMMARY OF THE INVENTION

To this end, the present invention provides a method of high speed recording of images and of information associated with the images by means of a motion picture camera for high speed shooting, the camera being equipped with an image pulse generator, and the method comprising the following steps during shooting: the information associated with the images is acquired and stored in a large capacity fast access memory at the image rate under the control of the image pulses generated by said camera image pulse generator; and at least one reference signal is written electro-optically on the motion picture film beside the image corresponding to the first stored information.

In the recording apparatus of the present invention, the image medium (the motion picture film) is different from the information medium since the information is recorded in a fast access memory. For example, if a 35 mm film is used having a length of 300 m and containing about 16,000 frames, and if 32 characters are recorded in association with each frame, a 512 Kbyte memory will suffice for storing the information. The method of the present invention requires the camera to be equipped with a device capable of providing an image pulse signal (or a middle-of-exposure signal) for synchronizing the inputting and recording of information in the memory, together with an electro-optical marking device for putting a reference signal on a marginal track of the motion picture film enabling the image frame which corresponds to the beginning of information storage to be identified. However, given that existing cameras are normally equipped with such an image pulse generator device or that they are capable of being fitted with such a device easily and at low cost, and given that the said electro-optical marking device may be constituted by a small number of LEDs or even by a single LED together with the associated current amplifiers, i.e. by means which are simple, cheap, and easy to install in a camera, the present invention makes it possible to use cameras which are much less expensive than those which have been equipped with complex and expensive electro-optical devices for writing information on the motion picture film in the form of matrices or in the form of characters in the clear. Further, the invention can easily be adapted to existing equipment.

Given that the memories which are currently commercially available are relatively small in volume, the memory used in apparatus in accordance with the present invention for storing information together with the associated central processor unit which is necessary for controlling the storage of said information in the memory at the rate at which the images are being shot, and also for transmitting the reference signal to the marking LED(s) for writing on to the motion picture film can easily be received in the information acquisition box which is conventionally disposed adjacent to the camera and connected thereto. Given that the quantity of information which can be stored in the memory is mainly limited by the capacity of said memory, and that this capacity may be as large as desired the present invention makes it possible to store a much greater quantity of information than could be written on the motion picture film itself. In addition, the invention can be used with cameras operating at very high rates of shooting, for example 10,000 image frames per second. In addition, by providing a memory of suitable capacity, it is possible to use the memory as a notepad for storing comments, e.g. concerning shooting conditions.

Further, the present invention allows the information to be read back simply and cheaply given the electronic and microcomputing means currently available. After shooting, the information stored in the memory of the information acquisition and storage box may either be:

(a) remotely transmitted over a serial, parallel, or radio link to equipment for storing said information on a cheap data medium (cassette, diskette, laser card, etc.), thereby releasing the camera and the associated information acquisition and storing box for further shooting; or (b) retained in the memory of said box if it is equipped with nonvolatile memory (EEPROM or battery backed-up memory, for example), with the information contained in the memory being used in conjunction with a conventional film reader after the film has been developed; or else (c) read from the memory by some other equipment, if the information acquisition and storage box is equipped with nonvolatile memory in plug-in form, e.g. in the form of cartridges.

BRIEF DESCRIPTION OF THE DRAWINGS

Implementations of the invention are described by way of example with reference to the accompanying drawings, in which:

FIG. 9 is a diagram of image pulse generator means incorporated in the FIG. 8 camera;

FIG. 10a shows a first embodiment of electro-optical marking means suitable for being installed in the FIG. 8 camera in order to write a reference signal on the motion picture film;

FIG. 10b shows a second embodiment of electro-optical marking means;

FIG. 11 shows a length of motion picture film including a reference signal obtained using the FIG. 10a marking means;

FIG. 12 is a waveform diagram showing the signals applied to the FIG. 10b marking means for writing image numbers on the motion picture film to constitute reference signals;

FIG. 13 shows a length of motion picture film having image numbers thereon obtained using the FIG. 10b marking apparatus;

FIG. 16 is a block diagram of one of the FIG. 14 memory cards; and

FIG. 17 is a block diagram of one of the FIG. 14 information acquisition cards.

MORE DETAILED DESCRIPTION

Figure 8:
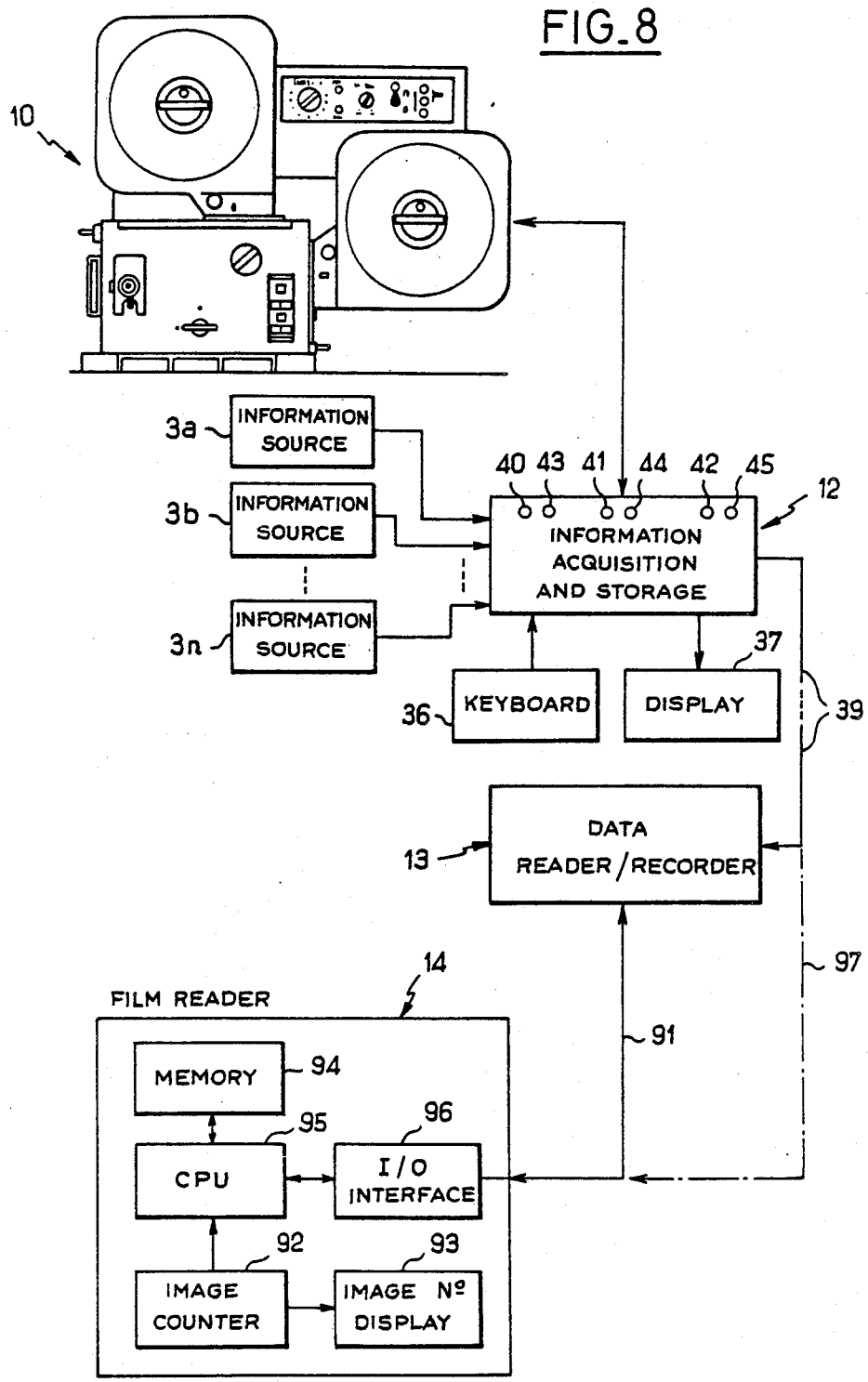
FIG. 8 is a diagram of an apparatus in accordance with the present invention for high speed recording of images and information associated with the images, together with a film reader for viewing the motion picture film after it has been developed.

The apparatus shown in FIG. 8 may be considered as comprising two subassemblies 10 and 12 for recording images and for acquiring and storing the information associated therewith, together with two subassemblies 13 and 14 for recording and exploiting the stored information and for examining the motion picture film.

The camera 10 in FIG. 8 for taking the shots may be identical with the camera 1 in FIG. 1 In addition, it includes means, known per se, for delivering an image pulse or a middle-of-exposure signal which is used for counting images during shooting and, as explained below, is also used for triggering the writing of blocks of information in the memory of the acquisition and storage box 12 at the image rate. As shown in FIG. 9, the image pulse generator means may be constituted, for example, by a disk 15 fixed on the output shaft 16 of the motion picture film drive device and having a notch or a hole 17 in its periphery. On each rotation of the shaft 16, a sensor 18 such as a photocell detects the passage of the hole 17 and emits a signal which is appropriately shaped and amplified by an amplifier 19 whose output 21 provides an image pulse signal STI. Depending on the position of the disk on the shaft 16, this signal is emitted to coincide either with the beginning or with the middle of each image.

Figure 2:
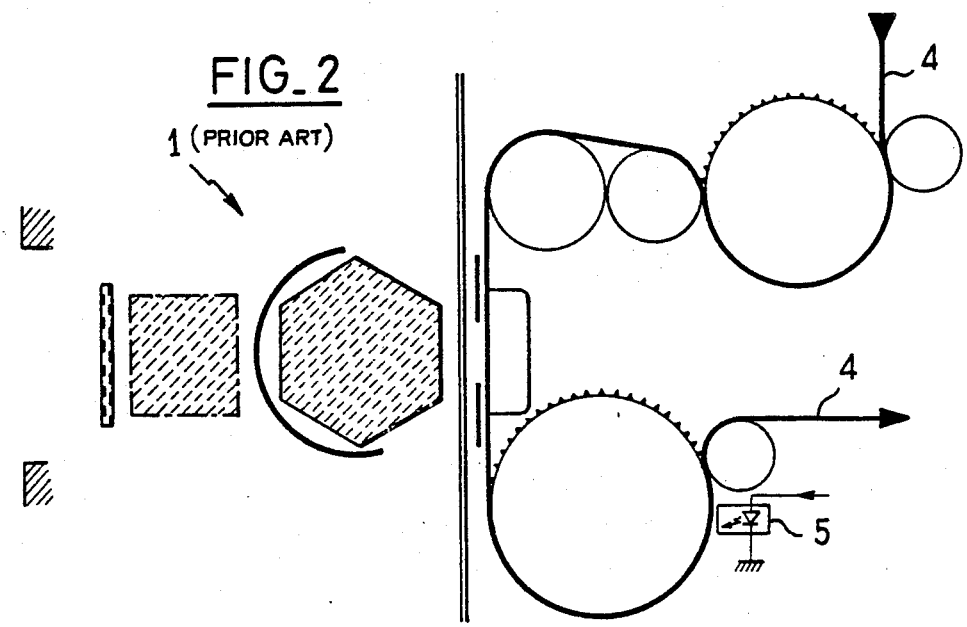
FIG. 2 shows first prior art electro-optical means for writing information on a motion picture film and suitable for installation in the FIG. 1 camera.
Figure 4:
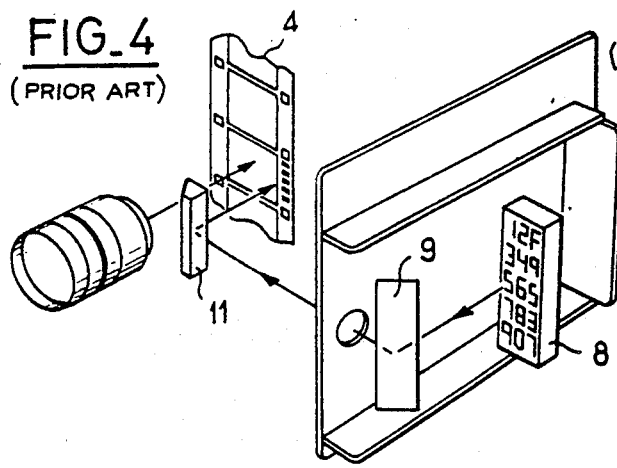
FIG. 4 shows second prior art electro-optical means for writing information on a motion picture film and suitable for installation in the FIG. 1 camera.
Figure 5:
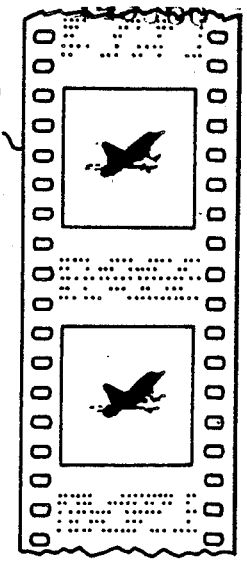
FIGS. 5 to 7 show other lengths of motion picture film obtained using the prior art apparatus and means of FIGS. 1 and 4.
Figure 3:
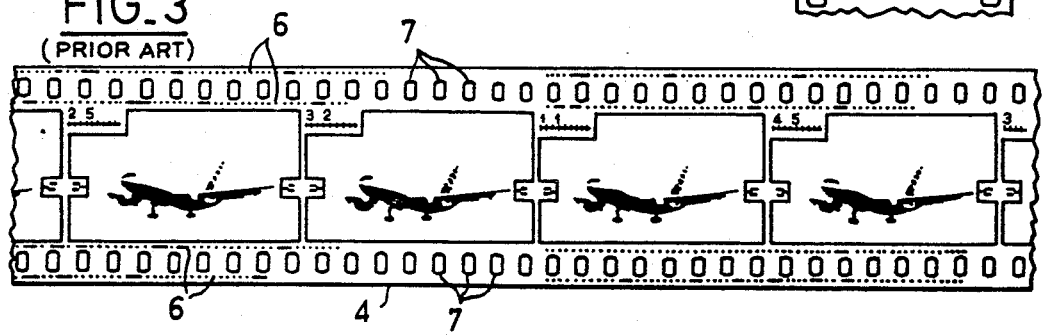
FIG. 3 shows a portion of a motion picture film obtained using the apparatus and means of FIGS. 1 and 2.
Figure 6:
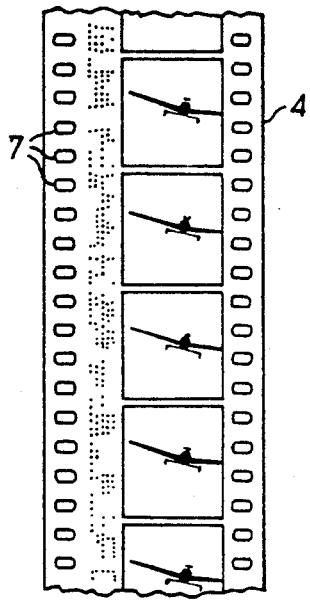
Figure 7:
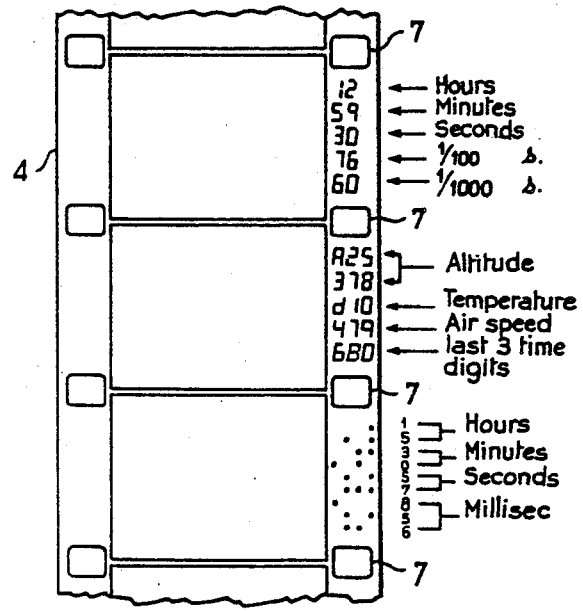

The camera 10 also includes electro-optical marking means for writing at least one reference signal on the motion picture film in order to identify at least that image of the film which corresponds to the first information recorded in the memory of the acquisition and storage box 12. As shown in FIG. 10a, the electro-optical marking means may comprise a current amplifier 22 which receives a reference signal SR on its input 23 and which has its output connected to a LED 24. The LED 24 may replace the electro-optical device 5 of FIG. 2 in order to write the reference signal SR on a marginal track of the motion picture film 4. The reference signal SR is emitted by the acquisition and storage box 12 to correspond with the first block of information stored in the memory of the box 12. The reference signal SR may be constituted by a single rectangular pulse which is written in the form of a dash on one side of the image which corresponds to the first block of stored information. However, in a preferred embodiment of the present invention, the reference signal SR may be constituted by a continuous signal which is written on a marginal track of the motion picture film 4 in the form of a line 25 whose beginning coincides with the image 26 corresponding to the first block of stored information and whose end coincides with the image 27 corresponding to the last block of stored information, as shown in FIG. 11.

In another embodiment of the present invention, the reference signal may be written on the motion picture film in the form of an image number. Although an image number could be associated with each image, it suffices in practice to write numbers on the film every n images, for example every 10 images as shown in FIGS. 12 and 13. In this case, the widths of the pulses used for writing the image numbers are less critical than they would be if an image number were to be written next to each image. FIG. 10b shows electro-optical marking means for writing image numbers on four parallel racks A, B, C, and D (FIG. 13) of the motion picture film 4. Four LEDs 24a, 24b, 24c, and 24d are associated with respective ones of the tracks A, B, C, and D. The four LEDs may replace, for example, the FIG. 2 electro-optical device 5. The LEDs 24a, 24b, 24c, and 24d are connected to the outputs of respective current amplifiers 22a, 22b, 22c, and 22d which receive respective decimal pulse trains SRa, SRb, SRc, and SRd on their respective inputs 23a, 23b, 23c, and 23d, once every ten images.

The numbers of pulses in the four pulse trains SRa, SRb, SRc, and SRd correspond respectively to the tens digit, the hundreds digit, the thousands digit, and the tens of thousands digits in the image number. In the example shown in FIGS. 12 and 13, image 28 has the number 92310, and image 29 has the number 92320.

Figure 1:
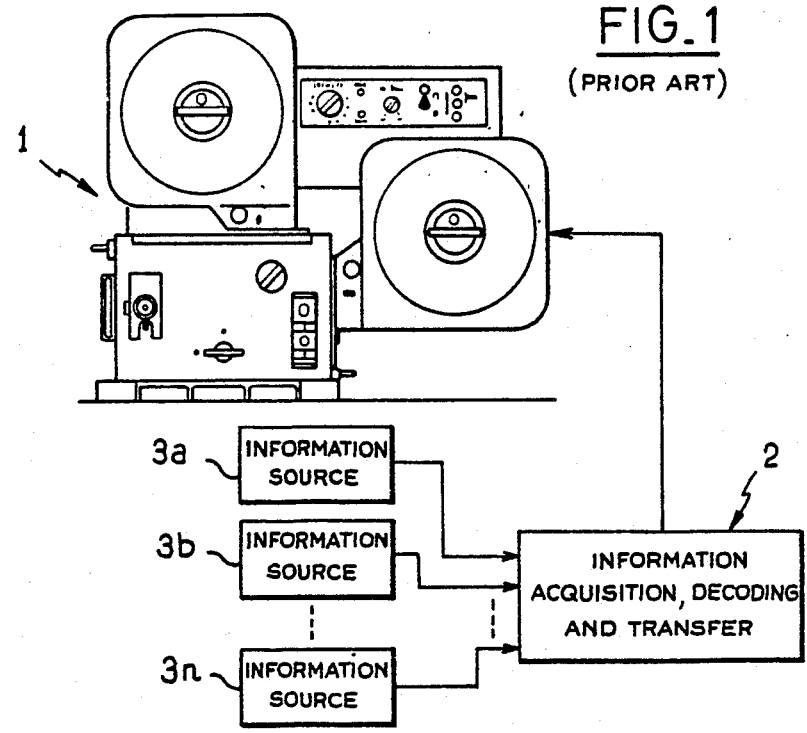
FIG. 1 is a diagram showing a prior art apparatus for high speed recording of images and information associated with the images.

Like the block 2 of FIG. 1, the acquisition and storage block 12 of FIG. 8 receives various kinds of information (e.g. IRIG B time, together with values of speed, pressure, temperature, etc.) coming from one or more sources of information 3a, 3b, ..., 3n. However, as described below with reference to FIGS. 14 to 17, the structure and the function of the electronic circuits contained in the acquisition and storage box 12 are different from the structure and function of the circuits contained in the prior art box 2.

Figure 14:
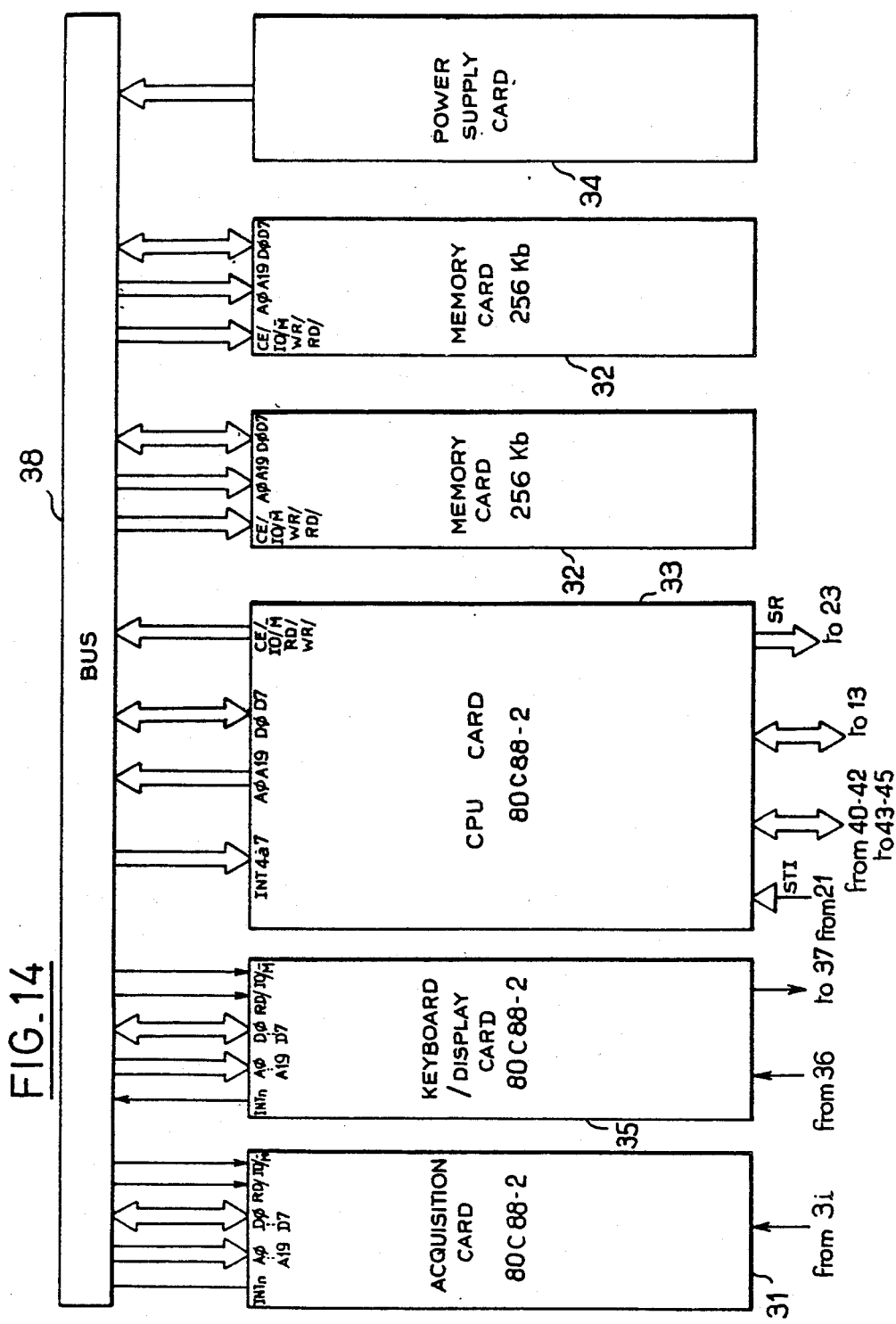
FIG. 14 is a block diagram showing the organization of circuits contained in the FIG. 8 information acquisition and storage box.

FIG. 14 shows the organization of the circuits in the acquisition and storage box 12. It comprises: at least one acquisition card 31 equipped with its own microprocessor and suitable for receiving and decoding information from one or more information sources 3i selected from the information sources 3a, 3b, ..., 3n of FIG. 8; at least one memory card 32, e.g. two memory cards each having a capacity of 256 Kbytes; a central processor unit card 33; and a power supply card 34 which provides the various power supply voltages required to operate the electronic circuits on the cards 31 to 33. Optionally, the box 12 may also include a keyboard/display card 35 equipped with its own microprocessor and controlling a keyboard 36 and a display 37 (FIG. 8). This enables an operator to enter additional parameters and data via the keyboard 36, to display them on the display 37, and to store them in the memories of one of the memory cards 32 under the control of the CPU card 33 (i.e. to use the memories as a notepad). The card 35 may have a conventional structure similar to that of a microcomputer. The cards 31 to 35 are interconnected by a bus 38.

The number of acquisition cards 31 depends on the number of information sources and on the nature and the form of the information provided by each of the sources (IRIG B time, parallel data, serial data, analog data representative of pressure, fluid speed, temperature, ...). A card for acquiring serial data is described below by way of example.

The total memory capacity provided by the memory card(s) 32, and consequently the number of memory cards required, depends on the total quantity of information to be stored during a shooting sequence (information coming from the sources 3a, 3b, ..., 3n and optionally additional information entered by the operator via the keyboard 36).

As shown in detail below, the CPU card 33 provides the following functions:

(a) at each image pulse signal STI, it requests that a block of information from one of the acquisition cards 3i should be sent thereto and it transfers said block of information to the battery backed-up memory card(s) 32;

(b) it manages the image numbers and the numbers of the blocks of information recorded in the memory card(s) 32;

(c) it controls the writing of the reference signal SR on the marginal track(s) of the motion picture film 4 (line 25 in FIG. 11 or image number in FIG. 13);

(d) after the shots have been taken, it controls an input/output interface which makes it possible to use a link 39 (FIG. 8) to transfer the blocks of information stored in the memories of the memory card(s) 32 to a recorder contained in block 13 of FIG. 8 so that said blocks of information can be written on a cheap data storage medium; and (e) it handles control signals coming from control buttons 40, 41, 42 and it actuates indicator lights 43, 44, and 45 which are associated with respective ones of the control buttons 40, 41, and 42 on the front face of the FIG. 8 acquisition and storage box 12. The three buttons 40, 41, and 42 may respectively comprise a "start" button, a "stop" button, and a "transfer" button, for example, with the transfer button being used to control the transfer of the blocks of information contained in the memories of the memory card(s) 32 to the recorder contained in the box or block 13 of FIG. 8.

Figure 15:
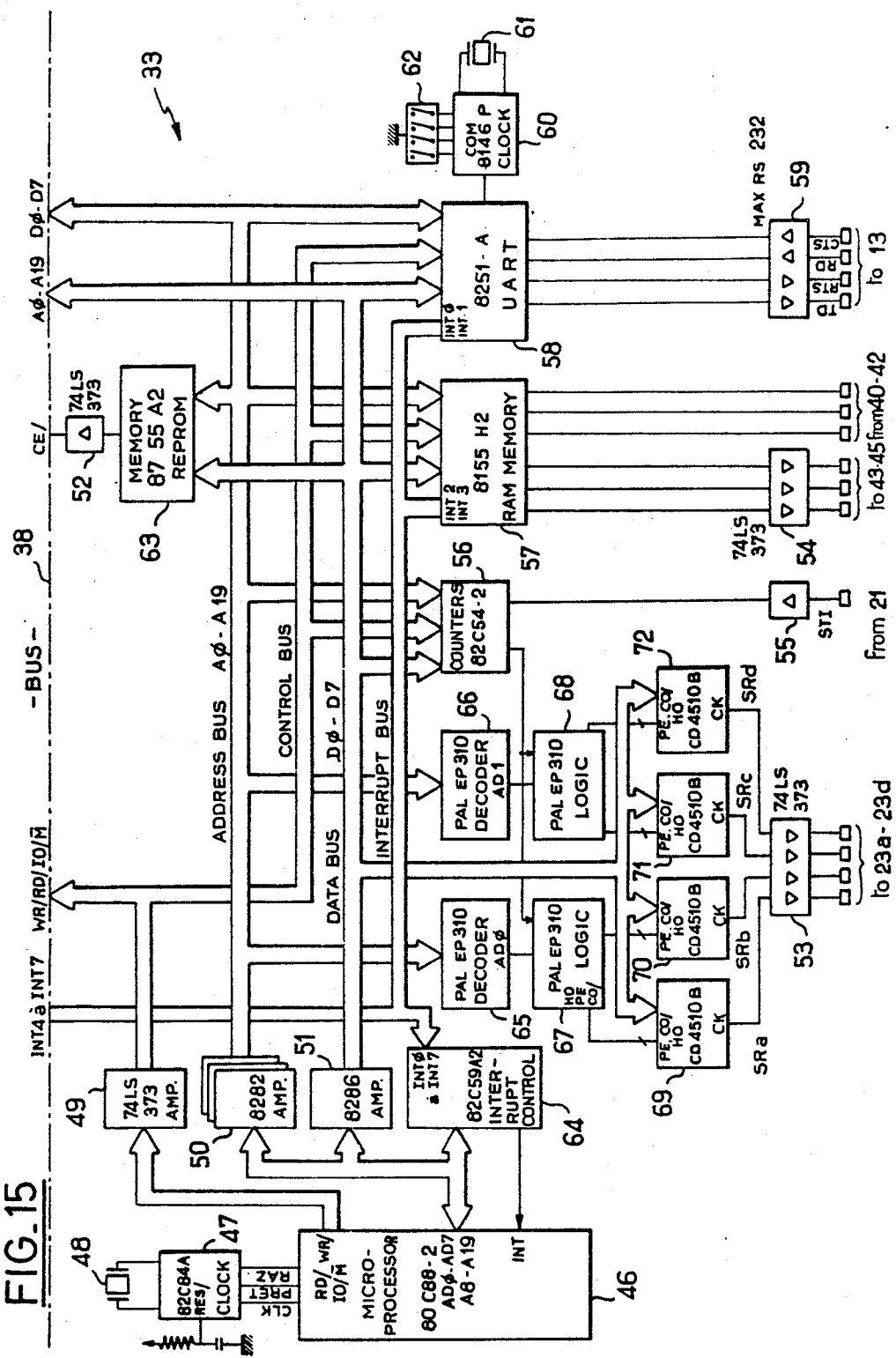
FIG. 15 is a block diagram of the FIG. 14 central processor unit card.

Reference is now made to FIG. 15 for describing one particular embodiment of the CPU card 33 shown in FIG. 14, supposing that there are two memory cards 32 each having a capacity of 256 Kbytes, with the link 39 of FIG. 8 being a serial link, and with the reference signal SR being the signal shown in FIGS. 10b and 12. As shown in FIG. 15, the CPU card 33 comprises:

a microprocessor 46, e.g. an 80C88-2 type circuit which is clocked by a clock signal CLK at 8 MHz provided by a clock circuit 47, e.g. an 82C84A type circuit used in conjunction with a crystal 48;

memory and power amplifier circuits 49 to 55, e.g. 8286, 8282, and 74LS373 type circuits, with the circuits 49, 50 and 51 serving to amplify the various address, data, and control signals from the microprocessor 46, the circuit 52 amplifying the memory module select signals CE/ directed to the memory cards 32, the circuit 53 amplifying the four pulse trains constituting the reference signal SR, the circuit 54 amplifying the signals to the three indicator lights 43–45 of FIG. 8, and the circuit 55 amplifying the image pulse signals STI coming from the FIG. 9 image pulse generator;

a counter circuit 56, e.g. an 82C54-2 type circuit which includes three programmable counters two of the counters serving to count image pulses STI as amplified by the circuit 55, and the third counter generating a clock signal HO for controlling the writing of image numbers on the marginal tracks A, B C, and D of the FIG. 13 motion picture film 4;

a memory circuit 57, e.g. an 8155 H2 type circuit which includes a 256 byte scratchpad working memory and two 8-bit ports one of which is programmed to be an input port and the other to be an output port, which ports are used for monitoring and controlling the control buttons 40–42 and the indicator lights 43–45 of the box 12;

a serial transmitter 58, e.g. an 8251-A type UART (Universal Asynchronous Transmitter/Receiver) circuit for providing serial transmission of the information contained in the memories of the memory cards 32 over the link 39 of FIG. 8 via a voltage level translator 59, e.g. a MAX RS 232 type circuit for use over a V24 or RS232C type junction;

a clock 60, e.g. a COM 8146 P type circuit driven by a crystal 61 and serving to determine the speed of data transmission over the link 39 towards block 13 of FIG. 8, with the speed being under the control of switches 60;

a memory circuit 63, e.g. an 87 55 A2 type circuit including a 2 Kbyte REPROM (reprogrammable read only memory) containing the operating program for the microprocessor 46, together with two 8-bit ports, one of which is used as an output for generating various control signals (e.g. the memory module select signal CE/);

an interrupt controller 64, e.g. an 82C 59 A2 type circuit which handles INT∅ and INT1 interrupt commands from the serial transmitter 58, INT2 and INT3 interrupt commands from the control buttons 40–42 (via the circuit 57), and INT4-INT7 interrupt commands from the acquisition card(s) 31; and four programmable logic circuits 65, 66, 67, and 68, e.g. four EP 310 type circuits, and four count-down circuits 69, 70, 71, and 72, e.g. four CD 4510 B type circuits, for controlling the writing of image numbers every ten images on the four marginal tracks A, B, C, and D of the FIG. 13 motion picture film 4.

The circuits 65 and 66 are decoders for addressing the 4-bit input ports of the count-down circuits 69–72.

The circuits 67 and 68 contain the control logic and the monitoring logic for the count-down circuits 69–72 and the logic for controlling the writing of clock pulses HO constituting the pulse trains SRa, SRb, SRc, and SRd for writing image numbers on the motion picture film 4 of FIG. 13.

The first counter of the counting circuit 56 is a 4-digit BCD (binary coded decimal) counter which counts the pulses in the image pulse signal STI corresponding to the tens digit, the hundreds digit, the thousands digits, and the tens of thousands digit in the current image number.

The second counter in the counting circuit 56 is a BCD counter which counts the pulses in the image pulse signal STI and whose content represents the units digits of the current image number.

The third counter of the counter circuit 56 is a programmable clock generator which serves to generate the clock pulses in the pulse trains SRa, SRb, SRc, and SRd used for writing the image number on the marginal tracks A, B, C, and D of the motion picture film.

Each time the second counter of the circuit 56 counts through ten, the microprocessor 46 reads the contents of the first counter of the circuit 56 and loads each BCD digit into the corresponding count-down circuit 69–72. Two write commands PE are required, one of them being enabled by AD∅ in order to load the count-down circuits 69 and 70 simultaneously (the tens digit and the hundreds digit), and the other being enabled by AD1 in order to load the count-down circuits 71 and 72 simultaneously (the thousands digit and the tens of thousands digit).

When the loading of each of the count-down circuits 69–72 has been completed, an associated D-type bistable circuit is set, thereby enabling the application of clock pulses HO to the count-down circuits and enabling said pulses to be written to the corresponding marginal tracks A, B, C, and D of the motion picture film. The roll-over signals CD/ of the count-down circuits 69–72 reset the D-type bistable circuits associated with each count-down circuit to zero and prevent pulses from being written on the corresponding marginal tracks of the motion picture film until said bistable circuits are set again, ten images later.

Given that the memory cards 32 of FIG. 14 have the same general structure, there follows a description of one of said cards only, given with reference to FIG. 16. As shown in FIG. 16, each memory card 32 comprises:

eight battery backed-up memory modules 73 with each of the modules 73 being constituted, for example, by a DS 1235 type circuit having a capacity of 32 Kbytes;

two decoders 74 and 75 each constituted by a 74 HC 138 type circuit, for example;

a two-input OR gate 76 having one input connected to control line CE/ and having its other input connected to control line IO/M̄0 of the bus 38 and whose output is connected to the G2B input of the decoder 75; and a one-out-of-eight switch 77 whose inputs are connected to selected outputs from the decoder 74 and whose output is connected to the G2A input of the decoder 75.

If two memorY cards 32 are provided, addresses 40000H to 7FFFFH (in hexadecimal notation) are assigned to the first card 32 and addresses 80000H to AFFFFH are assigned to the second card 32.

This is achieved in each card 32 by means of the first decoding circuit 74 which is connected to address lines A18 and A19 of the bus 38. In each card 32, when made active by the output signals from the switch 77, the selection of one or other of the memory modules 73 is performed by means of the second decoding circuit 75 which transmits the signal CE/(memory module select signal) to the module selected by the address present on lines A15, A16, and A17 of bus 38.

The information present on the data lines D0 to D7 is written or read from the selected module 73 at the address specified by address lines A0 to A14 of the bus 38 under the control of the signal WR/ (write enable) or OE/ (read enable) as the case may be.

There follows a description, with reference to FIG. 17 of the structure of card 31 in FIG. 14 for the particular case of a serial data acquisition card. The card 31 in FIG. 17 comprises:

a microprocessor 78, e.g. an 80C88-2 type circuit clocked by an 8 MHz clock signal CLK provided by a clock 79, e.g. an 82C84A type circuit in conjunction with a crystal 80;

a serial transmitter 81, e.g. an 8251-A type UART circuit for receiving serial data from one of the serial data sources via a voltage level translator 82, e.g. an MAX RS232 type circuit for providing a V24 or RS232C type junction;

a clock 83, e.g. a COM 8146P type circuit under the control of a crystal 84 which, in conjunction with switches 85, serves to set the speed at which information is received by the UART 81;

a memory 86, e.g. a 2732 A2 REPROM type memory containing the operating program for the card 31;

a memory circuit 87, e.g. an 8155 H2 type circuit which includes a 256 byte scratchpad memory and two 8-bit ports one of which is programmed as an output port for generating interrupts, when required, for sending to the CPU card 33;

a first-in first-out (FIFO) type memory 86 constituted by a DS 2010 type circuit, for example; and a PAL decoder 89, constituted by an EP 310 type circuit, for example.

The FIFO memory circuit DS 2010 comprises 1 Kbytes of memory under the control of a write counter and a read counter each of which points to a single byte in the memory. These circuits allow data to be interchanged between two processors operating at different speeds.

Data is written into the memory 88 under the control of signal W/ which increments the write counter and it is read from the memory 88 under the control of signal R/ which increments the read counter. The signal RT/ resets the read counter to zero, thereby enabling the same block of data to be read over several times if they are not rewritten in the meanwhile. Signal RS/ serves to reset both counters to zero.

The data stored in the memory 88 is read by the CPU card 33 by means of thirty-two read commands RD/ which are enabled by the address decoder 89. The decoder 89 appears to the CPU card 33 as an output port. The CPU card 33 then applies a command signal RT/ which resets the read counter to zero and sends an interrupt to the microprocessor 78 on the card 31. The microprocessor 78 then reads the state of a flag which is set to "1" if a new block of data has been formatted and written in the scratchpad memory of circuit 87. If the flag is at state "1", the microprocessor 78 writes this block of data into the FIFO memory 88 after resetting both the read and the write counters to zero and also after resetting the flag.

Each character received over the V24 serial junction (level translator 82) is stored When the last character of a data block has been received, the data in the scratchpad memory 87 can be written and formatted, and the flag can be set to state "1".

The operation of the circuits in the acquisition and storage box 12 of FIG. 8 is now described for a shooting sequence. The operator initializes the program by pressing the "start" control button 40.

Each image pulse signal STI increments the image number counters in the counting circuit 56 and causes the microprocessor 46 to read the information stored in the memory 88 of the, or each, acquisition card 31 and to write said information in the battery backed-up memories 73 of the memory card(s) 32. Since 32 bytes are written into the memory on each pulse in the image pulse signal STI, the data block number corresponding to the current image n is equal to:

starting address + (n − 1)*32.

Each time the contents of the second counter of the counting circuit 56 passes through 10, the corresponding image number is written on the four marginal tracks A, B, C, and D of the motion picture film. The values of the tens digit, the hundreds digit, the thousands digit, and the tens of thousands digit are read from the first counter of the counting circuit 56 and are loaded into the count-down circuits 69–72. When said values have been loaded therein, the writing of clock pulses HO onto the four tracks of the motion picture film is enabled, with said pulses being generated by the third counter of the count circuit 56 and with the numbers of pulses on each track corresponding to the values of the respective digits (tens digit, hundreds digit, thousands digit, tens of thousands digit). Each time one of the four count-down circuits 69–72 passes through zero, the writing of clock pulses HO on the corresponding marginal track of the motion picture film is stopped.

When the operator presses the "stop" button 41, the pulses in the image pulse signal STI are no longer counted and the information contained in the memories 73 of the memory cards 32 may be transferred to a receiver member via the serial transmitter 58, the level translator 59 (FIG. 15), and the link 39 (FIG. 8).

The box 13 of FIG. 8 may comprise:

a read/write device capable of writing information on a cheap data medium (laser card, cassette, diskette);

a first serial link for receiving blocks of information over the link 39 from the memories of the memory cards 32 in the box 12 after a sequence of shots has been taken, and for writing said blocks of information on the cheap data medium in the read/write device;

a random access memory whose capacity is not less than that of the capacity of the cheap data medium in the read/write device;

a second serial link for transmitting information read back from the cheap data medium in the read/write device and written in the random access memory to the film reader 14 over the link 91; and a microprocessor for controlling the operation of the above-mentioned items in the box 13 and also controlling the reception of the image number as sent by the film reader 14 in order to trigger the transmission to the film reader of the block of information which corresponds to the image currently being displayed.

The read/write device may be a TEAC novel MT2-24 cassette drive, a CANNON model CARDINAL laser card drive, or an EPSON model SD540 floppy disk drive.

The examination of the information in the images of the motion picture film and the exploitation of the information associated with the film images may be performed using the above-described box 13 in conjunction with the film reader 14. The film reader may be a conventional film reader, for example an SFAT model 1324 or model CLINFOC.

The film reader 14 comprises:

an electronic image counter 92;

a display 93 for displaying the numbers of the images provided by the counter 92;

a memory 94;

and a central unit 95 with an input/output interface 96, e.g. a serial transmitter and a voltage level translator (for a V24 or RS232 type link) similar to those described above for transmitting the number of the projected image to the box 13 over the link 91, said number being provided by the counter 92, and also for receiving the block of information corresponding to the projected image from the box 13.

The film reader 14 has a projection screen suitable for displaying each image of the motion picture film in full together with its marginal tracks. In practice, the operator uses the reference marks on the, or each, marginal track of the film (line 25 in FIG. 11 or image numbers on tracks A, B, C, and D in FIG. 13) to look for the image on the film corresponding to the first block of information that was stored in the memories of the memory cards 32 in the box 12 and has subsequently been transferred to the data medium in the read/write device in the box 13. Once the image corresponding to the first block of information has been found, the operator zeroes the image counter 92. Thereafter, data carried by the image itself is acquired either manually or automatically in known manner. The acquisition of this data may consist, for example, in measuring co-ordinates of points in the filmed object. After the data carried by the first image of the film has been acquired the film reader 14 automatically sends the image number to the box 13 which replies by transmitting the corresponding block of information.

Thereafter the operator advances the film, image-by-image or in steps of several images, using the conventional means with which film readers are equipped. As the film advances, the counter 92 counts the images and displays image numbers on the display 93. Each time the operator stops on an image, data carried by the image being displayed may be acquired either automatically or manually, and once the data has been acquired, the film reader automatically sends the number of the currently displayed image as provided by the counter 92 to the box 13 which replies by transmitting the corresponding block of information to the film reader 14.

The entire collection of data carried by the images of the motion picture film and acquired either manually or automatically by the film reader 14 together with the information transmitted by the box 13 to the film reader 14 is stored in the memory 94. This data can then be transferred and stored in a file or in a mass memory of a data processing system for subsequent processing.

It may be observed that the search for the first image of the motion picture film may be performed automatically if the film reader 14 is provided with photocells capable of reading the marginal tracks of the motion picture film (line 25 in FIG. 11 or tracks A, B, C, and D in FIG. 13).

Naturally, the specific implementation of the present invention described above has been given purely by way of example and is not limiting. Numerous modifications can easily be applied thereto by the person skilled in the art without going beyond the scope of the present invention. Thus, it is possible for the link 39 to be a parallel link or a radio link rather than a serial link. Further, instead of being connected to the read/write device in the box 13, the information acquisition and storage box 12 may be connected directly to the film reader 14 as shown diagrammatically by link 97 drawn in dotdashed lines in FIG. 8. This solution is cheaper in equipment since it makes it possible to do without the box 13; however, it suffers from the drawback of making the box 12 unavailable until the motion picture film has been developed and the information recorded in the box 12 has been transferred into the memory 94 of the film reader 14.

Another solution consists in making the memory cards 32 in the form of plug-in cartridges containing battery backed-up memories which, after shots have been taken, are removed from the box 12 and replaced with identical blank memory cartridges so that the camera 10 and the box 12 can be immediately reused for another take, if so desired. In this case, the box 13 or the film reader 14 may be fitted with a connector enabling them to receive the memory cartridge(s) in which the information has been stored, said information then being read back directly from said memory cartridges.

We claim:

1. A method of high speed recording of images and of information associated with the images by means of a motion picture camera for high speed shooting, the camera being equipped with an image pulse generator, and the method comprising the following steps during shooting: acquiring and storing the information associated with the images in a large capacity fast access memory at the image rate under the control of the image pulses generated by said camera image pulse generator; and electro-optically writing at least one reference signal on the motion picture film beside the image corresponding to the first stored information, whereby each piece of information recorded in said memory may be subsequently read and precisely associated with a respective image or picture frame of said film to which it is related.

2. A method according to claim 1, wherein the reference signal is written in a marginal track of the motion picture film in the form of a line whose beginning coincides with the image corresponding to the first stored information and whose end coincides with the image corresponding to the last stored information.

3. A method according to claim 1, wherein the reference signal is written on the motion picture film in the form of an image number.

4. A method according to claim 3, wherein the image number is written on the film once every ten images.

5. A method according to claim 4, wherein the image numbers are written on four parallel tracks of the film, with each image number being written in the form of four decimal pulse trains corresponding respectively to the tens digit, the hundreds digit, the thousands digit, and the tens of thousands digit of the image number.

6. A method according to claim 1, further comprising the steps of transferring the information stored in the fast access memory after shooting to a read/write device using a data storage medium, and recording said information on said data storage medium.

7. A method according to claim 6, further comprising the steps of using a film reader after the motion picture film has been developed to display and examine the information carried by the images of said film, said film reader being equipped with a memory, with an image counter device, and with a device for displaying the counted image numbers, and using the film reader to search for the reference signal on the film adjacent to the image corresponding to said first stored information in order to synchronize the film images with the corresponding information recorded on said data medium, and once said reference signal and the corresponding image have been found, resetting said image counter device to zero, extracting said first information from the data medium and transferring it into the memory of the film reader, and then extracting from said data medium the following information recorded on the data medium relating to any other selected and displayed image of the film and transferring the extracted following information into the memory of the film reader on the basis of the image number provided by said counter device.

8. A method according to claim 1, further comprising the steps of using a film reader after the motion picture film has been developed to display and examine the information carried by the images of said film, said film reader being equipped with a memory, with an image counter device, and with a device for displaying the counted image numbers, and using the film reader to search for the reference signal on the film adjacent to the image corresponding to said first stored information in order to synchronize the film images with the corresponding information recorded in the fast access memory, and once said reference signal and the corresponding image have been found, resetting said image counter device to zero, and extracting said first information from the fast access memory and transferring it into the memory of the film reader, and then extracting from said fast access memory the following information recorded in the fast access memory relating to any other selected and displayed image of the film and transferring the extracted following information into the memory of the film reader on the basis of the image number provided by said counter device.

* * * * *